United States Patent Office

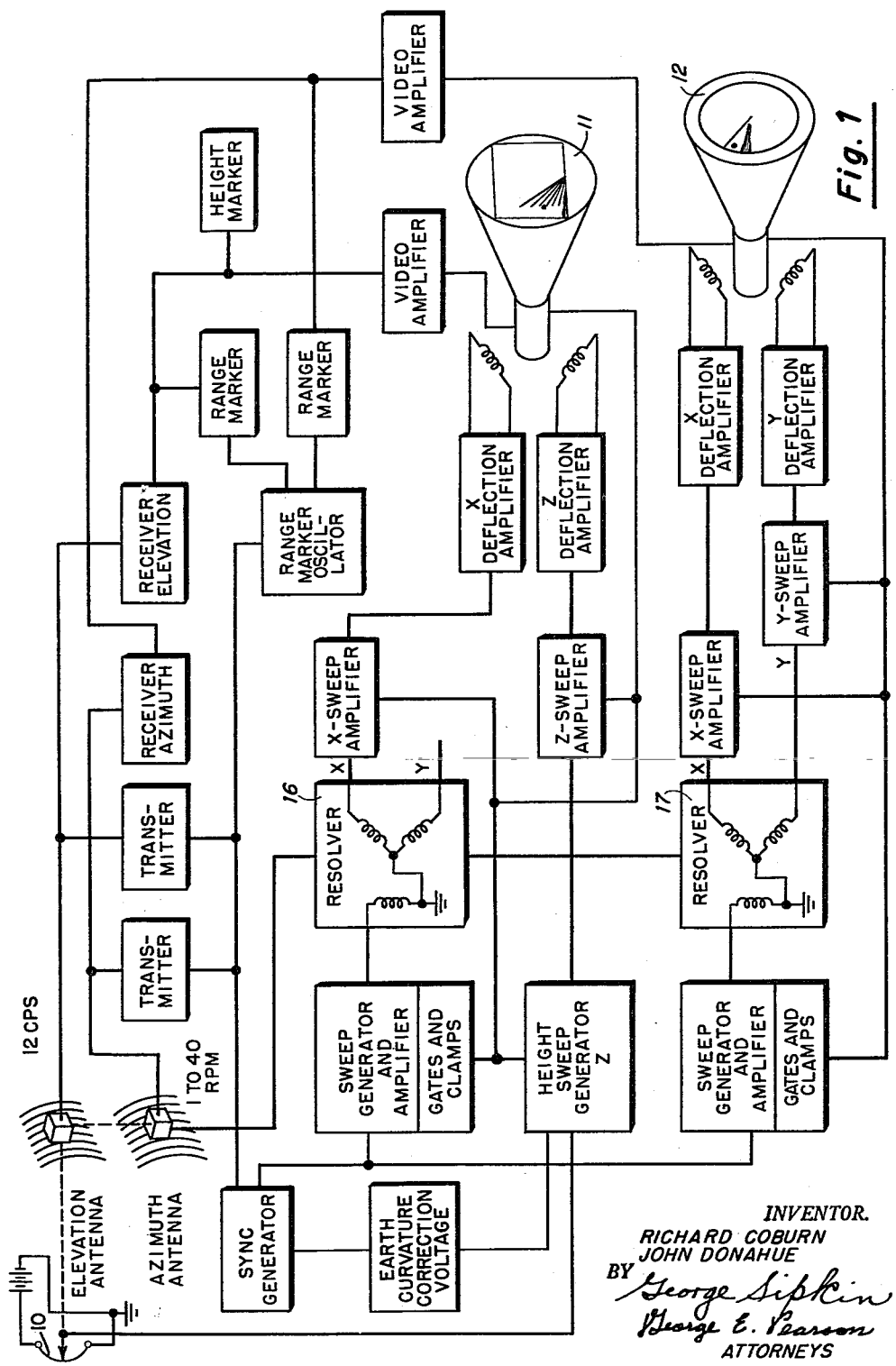

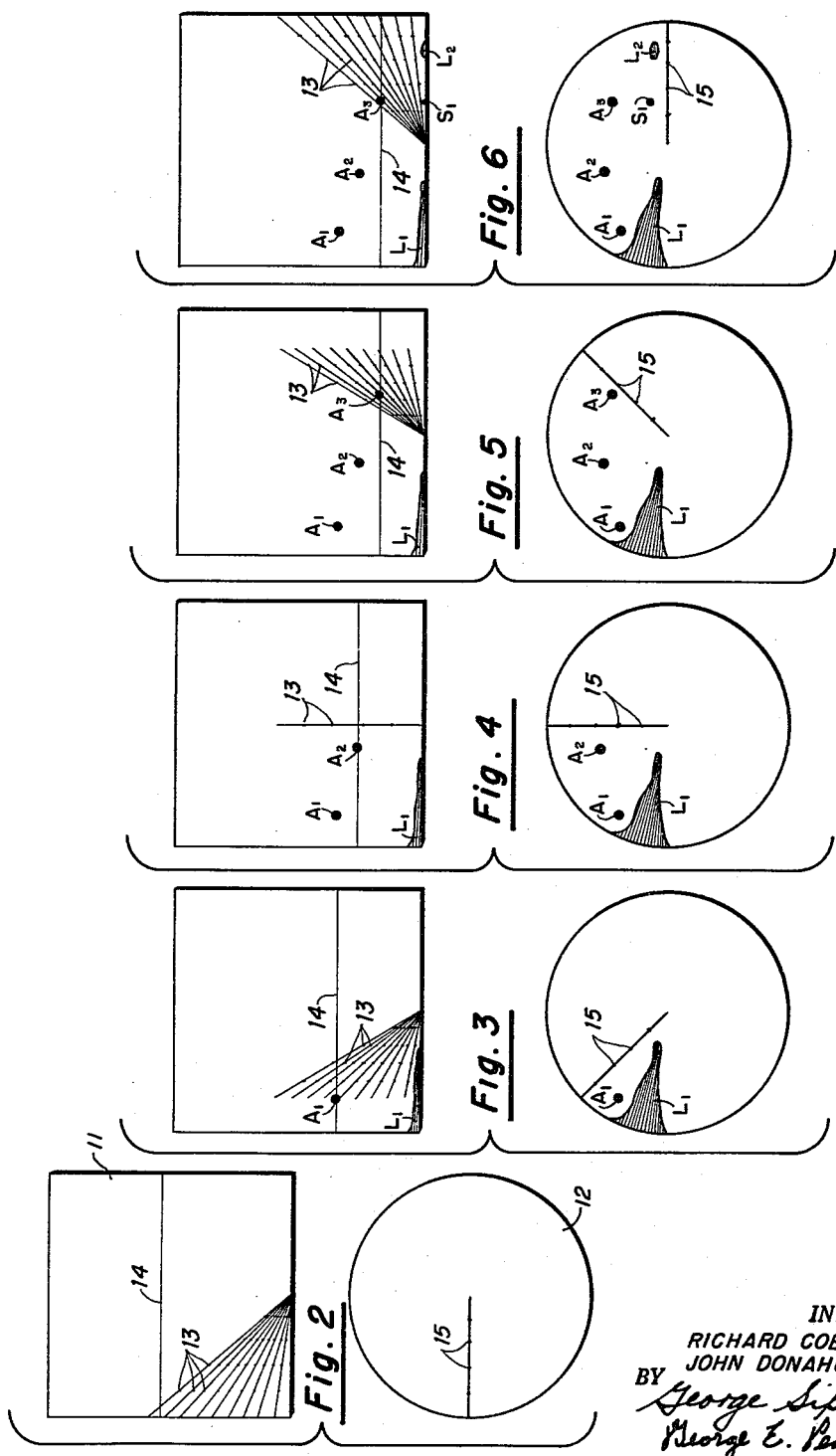

3,005,195
Patented Oct. 17, 1961

3,005,195
THREE COORDINATE DISPLAY SYSTEM
Richard Coburn, 2018 Catalina Blvd., and John Donahue,
244 Catalina Blvd., both of San Diego, Calif.
Filed Sept. 30, 1953, Ser. No. 383,414
6 Claims. (Cl. 343—7.9)
(Granted under Title 35, U.S. Code (1952), sec. 266)

The invention described herein may be manufactured and used by or for the Government of the United States of America for governmental purposes without the payment of any royalties thereon or therefor.

This invention relates to a three coordinate display system and more particularly to a system for the three coordinate display of spatial target information in orthographic projection on cathode ray tubes.

Many attempts have been made to portray information obtained by radar scanning in three dimensions. Most of these systems portray two dimensions in a conventional manner in a plan position indicator, usually the two dimensions in a horizontal plane which may be read out and displayed as range and bearing or as X and Y rectangular coordinates. The third dimension is usually portrayed by a form of coding which may be size, color, the length of a radial line extending toward the target, or a vertical strobe through the target. Read out of the third dimensional information is usually approximate or at best very inaccurate and oftentimes confuses or completely obliterates the information which would normally be obtained from the plan position indicator. Sometimes another tube is used displaying range plotted against height. Another system utilizes the plan position indicator showing bearing and range on an inner circle and the height shown on an outer annulus, where the radial distance from the outer edge of the inner circle indicates the height of the target. The two displays are correlated by means of target bearing, and, where two targets lie on the same bearing, it is impossible to determine the height of each individual target. None of these systems portray the three dimensional information in a form which presents a clear visual concept of the spatial arrangement of the objects such as land, air or sea targets with respect to own ship or adjacent land masses and configurations. Various forms of synthesized stereoscopic pictures have also been utilized for displaying three dimensional information utilizing polarized light or two color pictures with two images suitably offset and diminished to give a pictorial effect of three dimensions in space.

Although many methods for three dimensional and three coordinate displays have been utilized or proposed, all of these methods have serious limitations in one or more respects. Many of these methods are not adequate in a quantitative sense, since the pictures displayed are not accurate in all three dimensions, and others which portray accurately all dimensions are not adequate qualitatively for interpretation by the operator, since they are presented in a manner which makes it difficult to conceive the spatial configuration of the targets. Under certain conditions with multiple targets, the presentations of the previous methods result in overlapping, clutter, confusion, or ambiguity with respect to the actual location of the targets and no means is known for resolving these ambiguities. Another serious inadequacy of the previous methods is the lack of system adaptability with respect to the coordinate input which is acceptable to the systems, flexibility of function and the different electronic systems with which the display may be utilized. The information which may be fed into a display system might consist of cylindrical, spherical, or rectangular coordinates, and in most of the previous methods only two of these three systems of coordinates are acceptable. In many of the prior systems the information could not be plotted at all or could not be plotted meaningfully, and it was impossible to read position coordinates quickly and with accuracy. Many of the prior visual display systems are useful with only one electronics system and can only be utilized with difficulty, if at all, with the other electronics systems, such as radar, simulators, and sonar. Many of the refinements which can be utilized in connection with some visual displays are not universally usable with all such displays. Earth curvature corrections, expandable scale, off-centering, and plotting directly on the scope with a conductive galss overlay for accurate read out cannot be utilized with many of the previous systems. Each of the prior art systems or methods of display in three coordinates or three dimensions is deficient in certain respects.

One preferred embodiment of the present invention as disclosed herein consists of a circuit for resolving raw radar data and applying it to the deflection coils and grids of two cathode ray tubes to produce an elevation view in one tube and a plan view in the other tube, representing the target or targets accurately in the X and Z coordinates and in the X and Y coordinates respectively.

One object of the present invention is to provide a system and display for presenting three coordinate target information in correlated plan and elevation views wherein the additional information is presented in true distortion free coordinates to provide a clear concept of three dimensional structural configuration to the operator.

Another object of the present invention is to provide an improved method and apparatus for presenting a three coordinate display on cathode ray tubes wherein all three coordinates are represented accurately to facilitate read out and tracking.

Another object of the present invention is to provide an improved display for a three coordinate target information which facilitates interpretation and the perception of spatial configuration by a correlation analogous to dimensionality experienced in every day life, and therefore presenting a display which appears more natural and requires less training for proficiency in operation.

A further object of the present invention is to provide a system for three coordinate display of spatial target information which will accept all three of the commonly utilized three coordinate input systems, that is, spherical, cylindrical, and rectangular, and which may be utilized in conjunction with radar, sonar, and various types of simulators.

A still further object of the present invention is to provide a three coordinate display which minimizes overlapping, clutter and confusion and wherein ambiguities may be readily resolved without affecting the qualitative interpretation of the display.

Still another object of the present invention is to provide a system and apparatus for the display of three dimensional information which may be readily modified to utilize numerous refinements to facilitate rapid and accurate interpretation and use of the information such as earth curvature corrections, expandable scales, off-centering, plotting on a conductive glass overlay on the cathode ray tube, and the use of hooking and automatic tracking techniques commonly used in conjunction with the conventional plan position indicator type of display.

Still another and further object of the present invention is to provide a method and apparatus for resolving and displaying information obtained in three coordinates which may be readily modified or expanded, and provided with suitable switches and controls for accepting numerous types of input, and displaying the spatial target information in a number of different manners utilizing the same basic system and circuitry.

Other objects and many of the attendant advantages of this invention will be readily appreciated as the same becomes better understood by reference to the following detailed description when considered in connection with the accompanying drawings wherein:

FIG. 1 is a block diagram illustrating one preferred form of the present invention applied to a radar system utilizing elevation and azimuth antennae.

FIGS. 2 through 6 are a series of correlated views of the images presented on the upper and lower tubes to show the development of a plurality of targets and land masses during 180 degrees of the sweep.

Referring now to the drawing in detail and particularly to FIG. 1 wherein one preferred and simplified embodiment of the present invention is shown in block diagram form in conjunction with a radar system utilizing two antennas, an elevation antenna and an azimuth antenna.

Both antennas are rotated about a vertical axis at a relatively slow speed usually about 1 to 40 revolutions per minute. The elevation antenna or the energy beam therefrom in addition is oscillated about a horizontal axis at a more rapid rate which may be, for instance, approximately 12 cycles per second or any other desired speed which will produce a picture of adequate resolution.

The sync generator or timer transmits a synchronizing signal to each of the transmitters connected to the azimuth and elevation antennas and to the sweep generators for the upper and lower cathode ray tubes 11 and 12.

A pair of resolvers 16 and 17 are suitably connected mechanically or electrically to the antennae for synchronous revolution therewith at the same speed as the rotation of the antenna about the vertical axis. Each of the resolvers is connected respectively to its associated sweep generator and amplifier, and produces an X and Y component or signal corresponding to the relative bearing or polar angular aspect of the antenna.

A height sweep generator is connected to a tilt potentiometer 10 mounted on the elevation antenna assembly and which in FIG. 1 is located within the box which depicts the elevation antenna assembly. The potentiometer develops a voltage corresponding to the angle of elevation of the narrow beam of the elevation antenna which is fed to the height sweep generator. The height sweep generator develops a sawtooth voltage which is applied through the Z sweep amplifier and the Z deflection amplifier to the vertical deflection coil of cathode ray tube 11.

The X and Y components or signal voltages developed by one of the resolvers 17 are applied through the X sweep amplifier and Y sweep amplifier respectively and thence through the X deflection amplifier and Y deflection amplifier respectively to the horizontal and vertical coils of the lower cathode ray tube 12, whereas only the X component or signal voltage of the other resolver 16 is applied through an X sweep amplifier and X deflection amplifier to the horizontal coil of the cathode ray tube 11. Suitable gates and clamps are applied to the sweep amplifiers and the grids of tubes 11 and 12.

The video signals received by the antennae are transmitted through an elevation receiver and an azimuth receiver and thence through video amplifiers to the cathode ray tubes 11 and 12 respectively. Suitable height markers may also be applied through the video amplifier to the cathode ray tube 11. A range marker oscillator which is triggered by a signal from the sync generator activates a pair of range markers which supply an intensifying range marker signal to each of the cathode ray tubes through their respective video amplifiers.

The pictures displayed by the upper and lower cathode ray tubes 11 and 12 are clearly illustrated in the series of FIGS. 2 through 6 which show the development of a plurality of air and sea targets and land masses over a 180 degree sector taken at 45 degree intervals. The actual picture displayed on the tubes 11 and 12 will appear as light lines and areas formed by activation of the phosphorescent coating by the electron beam on the dark face of the tube, but is shown as dark lines and shaded areas on a white background for clarity in the drawings.

It will be apparent that, during a single complete elevation cycle, a complete triangular area will be scanned by a plurality of radial lines on the tube 11 while a single line is being scanned repeatedly on the tube 12 as illustrated in FIG. 2. While only nine lines have been shown covering the triangular area on tube 11 for the sake of clarity, it will be understood that this area will be covered in actual use by a large number of lines corresponding to the number of discrete signals transmitted during each period of oscillation of the elevation antenna, and each line will have a plurality of intensified spots such as those indicated at 13 at equal intervals produced by the range marker which correspond to the range marking spots 15 on the lines on tube 12. Actually the plurality of spots at each interval of horizontal range will blend into a number of vertical lines.

FIG. 3 illustrates the development of an air target A1 and a land mass L1 after 45 degrees rotation of the sweep, the sweep being shown during 1 cycle of the elevation antenna and the targets remaining on the screen due to persistence of the intensified spots and areas caused by the video signal.

The picture is shown in FIG. 4 with the sweep at 90 degrees from that shown in FIG. 2, and in this position it is possible to have some ambiguity with two targets directly in line and at different ranges and elevations. However, this ambiguity could be resolved at once by rotation of the target field 90 degrees from the position shown. Gradual rotation of the target field would permit the viewer to see any sectional elevation view which he desires. While provision for rotation has not been shown in the block diagram of FIG. 1, such modification could be readily applied utilizing conventional techniques to the circuit of the present invention as shown in FIG. 1, for example by interchanging the X and Y outputs of the resolvers 16 and 17 to the respective sweep amplifiers for both tubes 11 and 12, i.e., the Y output of resolver 16 would be connected to the X amplifier for tube 11, and the X and Y outputs of resolver 17 would be connected to the Y and X amplifiers respectively for tube 12, or by mechanically or electrically rotating both sets of coils simultaneously. In practice, this may be accomplished by reversing the resolver leads by a suitable switching arrangement. With such leads interchanged, the tube indications that appeared in FIG. 4 now appear in FIG. 2 and the range marker lines 13 are spread sufficiently to prevent them from moving progressively closer together, or from being superimposed one on the other.

Additional air targets A2 and A3 are shown developed in FIGS. 4 and 5, where the sweep has progressed through an additional 45 degree angle in each view. In FIG. 6 the sweep of the 180 degree sector has been completed with the additional development of a sea target, such as a ship S1, and an additional land target or island, L2.

Some ambiguity also exists with respect to the targets A3 and S1 which might be resolved by a close observation of the timing as the sweep progresses, but if desired, this ambiguity could also be readily resolved by rotation of the field through a 90 degree angle in either direction.

The present arrangement permits the resolution of certain ambiguities by timing with a large degree of facility, since the correlation between the scopes is relatively easy by a mere vertical alignment which could, if desired, be facilitated by vertical lines extending across both scopes, however, the range markers serve substantially the same purpose and in most cases will provide sufficient correlation between the targets on the displays in the upper tube and the lower tube which correspond to an elevation and plan view in conventional drafting techniques.

While the visual effect is difficult to portray in a series of drawings, the correlation of targets is materially assisted by watching the sweep on both tubes simultaneously with the same target showing on both the upper and lower scopes simultaneously and in direct vertical alignment which facilitates the qualitative interpretation of the picture as the sweep progresses.

If desired, the observation may be limited to a particular area on a larger scale by range expansion and range and sector gating, but still maintaining the correlation and vertical alignment of targets to present a pictorial representation which is readily accepted and interpreted by the operator.

It will be apparent that all three dimensions are presented accurately to scale in the two views, the height being obtained accurately from the elevation view, and the range and bearing, or if desired the X and Y coordinates, obtained from the plan view on the lower tube.

In the vertical scan as shown from FIG. 2 to FIG. 6, the range is such that the earth's curvature must be considered and corrective adjustments made. Without adjustment the uniform height reference line 14 would have to be curved upwardly in the middle to follow the earth's curvature contour and would further complicate the reading of elevation. To bring all objects of the same height into horizontal alignment on the scope (making line 14 horizontal as shown), earth curvature corrections must be made to the Z or height deflection. Thus, by adding the earth curvature correction voltage to the Z-sweep voltage, the line between objects of the same height will be a straight horizontal line instead of a line curved in conformance with the earth's surface.

The preferred means of automatically correcting target height data for earth curvature to provide accurate readout of height information is illustrated in FIG. 1, wherein an earth curvature correction voltage generator is connected to the sync generator and supplies a non-linear time varying voltage having an amplitude proportional to the square of the instantaneous radar range which is added to a linear saw tooth voltage in the height sweep generator. The composite signal is modulated by the trigonometric functions of the potentiometer on the elevation antenna to provide a non-linear Z-sweep voltage which combined as resultant forces with the linear X-sweep voltage produces upwardly curving sweep traces on the XZ display in the upper tube 11. Therefore target lines of constant height above the curved surface of the earth such as line 14 would appear as straight horizontal lines on the XZ display and all targets could be directly interpreted with regard to height and an accurate readout of height information could be obtained regardless of range and bearing.

A joystick readout with or without tracking may also be utilized in conjunction with both the upper and lower tubes 11 and 12, following conventional techniques.

It will be obvious that the circuit shown in block diagram form in FIG. 1 which is adapted to accept the spherical input of raw radar can be readily adapted to accept cylindrical data from raw radar or other analogous search and object locating systems such as sonar, or the rectangular coordinates from synthetic data as supplied by a radar or sonar simulator.

While the system shown is adapted for use with a beam of energy consisting of electro-magnetic radio waves, it will be obvious that similar apparatus may be utilized with a beam of sound energy such as that used in sonar or any other type of energy which may be converted into an electrical signal to supply video information to the cathode ray tube or any other type of display device functioning in an analogous manner.

The system shown in the block diagram of FIG. 1 utilizes two antennas for practical reasons, since the resolution of the picture on the lower scope with the azimuth antenna radiating a separate beam of energy in a single plane is much better than that which could be obtained with the scan of the elevation antenna at a different pulse repetition frequency and nodding concurrently with its rotational movement about a vertical axis. However, the X, Y and Z components or signals could obviously be all taken from the elevation antenna utilizing only one resolver, but the picture would not be as distinct and the range for clear definition on the plan or X—Y scope 12 would be somewhat less.

It will be apparent that cathode ray tubes with either electro-magnetic or electro-static deflection can be utilized in conjunction with the present invention and would merely involve the proper design of the circuits for use therewith.

It is sometimes desirable particularly with raw data to maintain a sweep pattern on the tubes which corresponds to the antenna movement, however, using the present system in connection with synthetic data on a trainer or simulator equipment, it is not necessary to provide a sweep of this nature.

While the present system has shown a search system which covers 360° or complete area coverage with limited elevational angle, it will be obvious that the sweep could cover a spherical or hemispherical volume or be restricted to a pyramidal volume for use in conjunction with an aircraft landing system or for section fire control with the antenna nodding in a substantially vertical plane and oscillating between limits in a substantially horizontal plane in which case the sweep on the scope would correspond to the antenna movement. It might even be desirable under certain conditions to search and display in planes which are not perpendicular to each other.

While both of the cathode ray tubes have been shown as circular, it will be apparent that either or both might be rectangular in shape and it may be desirable in order to limit the space requirements of the design to provide a rectangular tube for the X—Z display and a circular tube for the X—Y display. Another pair of tubes on the same circuit or an additional tube for the display of the X—Z coordinates might be added to the present circuitry to provide both a front and side elevational view to eliminate the necessity for rotation of the target field or to provide separate monitoring of two or more separate sectors for fire control purposes.

A single tube could be utilized to display both XY and XZ views for a 180° sector by time sharing the use of a common electron gun structure and deflection system.

Another preferred means of displaying both XY and XZ views on a single screen is the use of a single dual-gun electrostatic deflection type of cathode ray tube as disclosed in the co-pending application of John Donahue for Three Coordinate Orthographic Display System, Ser. No. 541,868, filed October 20, 1955, now U.S. Patent No. 2,951,244, issued August 30, 1960.

Other refinements which can be readily utilized in conjunction with the system and circuitry of the present invention as shown is the use of polar off-centering, gating in bearing and bearing sector, gating in range and range sector, or gating in both bearing and range simultaneously by separate controls, and an area coverage indicator to show the portion of the maximum area covered by the search system which is displayed on the XZ and XY tubes when using expanded scales and gating. Conductive glass overlay for readout of coordinate information may also be utilized readily in conjunction with the present system to provide a rapid indication of the position coordinates of all targets with respect to any desired origin.

Automatic tracking and plotting can also be adapted readily to the system and apparatus of the present invention, and results can be readily interpreted without difficulty. The display system is also particularly adapted for use with photographic techniques, where a series of pictures may be taken of both tubes simultaneously and readily interpreted to follow the progress of any action or activity in a particular area at a later time.

The circuit shown in FIG. 1 may also be modified and with a simple switching arrangement can selectively display an isometric view in the upper tube 11. Such an arrangement is disclosed in the co-pending application of L. G. Harris, Ser. No. 385,900, filed October 13, 1953.

Obviously many modifications and variations of the

What is claimed is:

1. A three coordinate radar display system comprising a pair of vertically aligned cathode ray tubes each having an indicating electron beam with deflecting elements and an intensity control operative to control said indicating beam, an antenna system adapted to scan a volume of space with a narrow directional beam of energy, said antenna system being rotatable about a substantially vertical axis and oscillatable about a substantially horizontal axis, a sweep generator adapted to generate a sweep voltage, means operatively connected to said sweep generator and actuated by rotation of said antenna system about said vertical axis for generating X and Y sweep voltages proportional to the rectangular coordinates corresponding to the angular position of said antenna system about said vertical axis, a height sweep generator, a potentiometer associated with said antenna system and adapted to generate a voltage proportional to the angular position of said antenna about said horizontal axis, said potentiometer being operably associated with said height sweep generator to provide a Z sweep voltage proportional to the angular position of said antenna system about said horizontal axis, means for applying the X and Z sweep voltages to the deflecting elements of the upper one of said cathode ray tubes, means for applying the X and Y sweep voltages to the deflecting elements of the lower one of said cathode ray tubes, and means for transmitting and receiving a series of radio-frequency pulses through said antenna system and applying the echo pulse signal from an object in said volume of space to the intensity controls of said cathode ray tubes to produce a visible display on said tubes representing the objects in said volume by spatial coordinates in three dimensions with the common coordinate display in alignment on both of said tubes.

2. A three coordinate radar display system comprising a pair of vertically aligned cathode ray tubes each having an indicating electron beam with deflecting coils and an intensity control grid operative to control said indicating beam, an antenna system adapted to scan a volume of space with a narrow directional beam of energy, said antenna system being rotatable about a substantially vertical axis at a relatively low angular velocity and oscillatable about a substantially horizontal axis at a relatively high angular velocity, a sweep generator adapted to generate a sweep voltage, a resolver operatively connected to said sweep generator and actuated by rotation of said antenna system about said vertical axis for generating X and Y sweep voltages proportional to the rectangular coordinates corresponding to the angular position of said antenna system about said vertical axis, a height sweep generator, a potentiometer associated with said antenna system and adapted to generate a voltage proportional to the angular position of said antenna about said horizontal axis, said potentiometer being operably associated with said height sweep generator to provide a Z sweep voltage proportional to the angular position of said antenna system about said horizontal axis, means for applying the X and Z sweep voltages to the deflecting coils of the upper one of said cathode ray tubes, means for applying the X and Y sweep voltages to the deflecting coils of the lower one of said cathode ray tubes, and means for transmitting and receiving a series of radio-frequency pulses through said antenna system and applying the echo pulse signal from any object in said volume of space to the intensity controls of said cathode ray tubes to produce a visible display on said tubes representing the objects in said volume by spatial rectangular coordinates in three dimensions with the common X coordinate displayed in alignment on both of said tubes.

3. A three coordinate radar display system comprising a pair of display tubes each having an indicating beam with deflecting elements and an intensity control operative to control said indicating beam, an antenna system adapted to scan a volume of space with a narrow directional beam of energy, said antenna system being adapted to vary the direction of said beam of energy about a substantially vertical axis and about a substantially horizontal axis, a sweep generator adapted to generate a sweep voltage, means operatively connected to said sweep generator for generating X and Y sweep voltages proportional to the rectangular coordinates corresponding to the angular position of said beam of energy about said vertical axis, a height sweep generator adapted to provide a linear saw-tooth voltage, selectively operable means associated with said height sweep generator to add a non-linear earth curvature correction voltage to said linear voltage, means operably associated with said height sweep generator to provide a Z sweep voltage related to the angular position of said beam of energy about said horizontal axis, means for applying the X and Z sweep voltages to the deflecting elements of the upper one of said cathode ray tubes, means for applying the X and Y sweep voltages to the deflecting elements of the lower one of said cathode ray tubes, and means for transmitting and receiving a series of radio-frequency pulses through said antenna system and applying the echo pulse signal from an object in said volume of space to the intensity controls of said cathode ray tubes to produce a visible display on said tubes representing the object in said volume by spatial coordinates in three dimensions with the common coordinate displayed in alignment on both of said tubes.

4. In a direction, ranging and elevation system, in combination, an antenna rotatable in azimuth and oscillatable in elevation, a cathode ray tube having beam deflecting means, means for obtaining a first sweep voltage having an amplitude proportional to the trigonometrical function of the azimuth angle of said antenna, means for applying said voltage to said first deflecting means to deflect the beam in a horizontal direction on the screen of said tube, means for obtaining a second sweep voltage having an amplitude proportional to the elevation angle of said antenna, means for applying said second voltage to said deflecting means to deflect the beam in a vertical direction on the screen of said tube, means for synchronously reducing both said voltages to zero intermittently at a predetermined frequency, the trace of said beam in response to deflection by said voltages simulating the appearance on said tube screen of a triangular area indicative of the elevation sweep of said antenna, said triangular area rotatable in synchronization with the azimuth sweep of said antenna about a vertical axis passing through the zero deflection position of said beam to present oblique projections of said triangular area at all azimuth positions except 90° and 180° azimuth.

5. The system of claim 4, including a second cathode ray tube having beam deflecting means, means for obtaining a voltage identical with said first mentioned voltage, means for obtaining a second voltage in quadrature phase relationship with said first voltage proportional to another trigonometrical function of the azimuth angle of said antenna, means for applying both said last mentioned voltages to said deflecting means to produce a plan position indication type of beam deflection on said second tube screen, and means for synchronously reducing the voltages of asid second tube to zero intermittently at said predetermined frequency.

6. The system of claim 5, including means for indicating horizontal range on both tubes, said range indicating means in both tubes being in alignment throughout a complete azimuth sweep.

(References on following page)

References Cited in the file of this patent

UNITED STATES PATENTS

| | | | |
|---|---|---|---|
| 2,427,905 | Fyler | Sept. 23, | 1947 |
| 2,448,007 | Ayres | Aug. 31, | 1948 |
| 2,459,481 | Wolff et al. | Jan. 18, | 1949 |
| 2,584,034 | Lee | Jan. 29, | 1952 |
| 2,585,855 | Sherwin et al. | Feb. 12, | 1952 |
| 2,616,078 | Fyler | Oct. 28, | 1952 |
| 2,637,025 | Cutler | Apr. 28, | 1953 |
| 2,649,581 | Tasker et al. | Aug. 28, | 1953 |
| 2,663,868 | Tasker | Dec. 22, | 1953 |

OTHER REFERENCES

"Three-Dimensional Cathode-Ray Tube Displays," by E. Parker, Journal Institute of Radio Eng. (Great Britain), September 1948, pages 371 to 390, pages 378–379 relied on.